Oct. 16, 1934.   R. J. HICKS   1,977,274
HEADLIGHT FOR VEHICLES
Filed Dec. 26, 1933   2 Sheets-Sheet 1
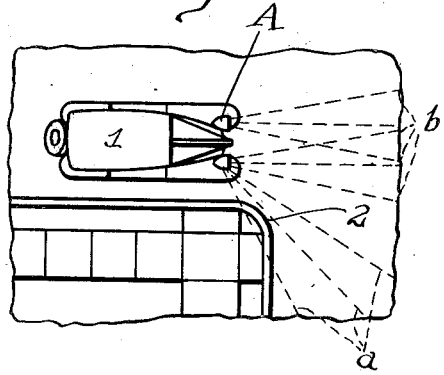
Fig. 1
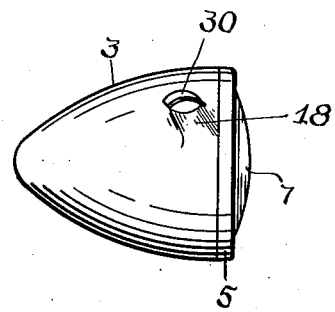
Fig. 3
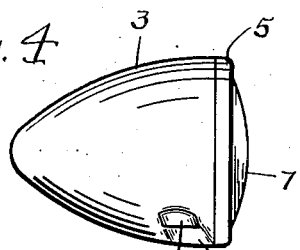
Fig. 4
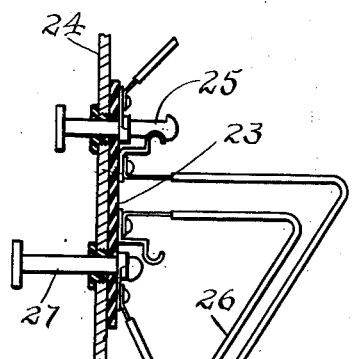
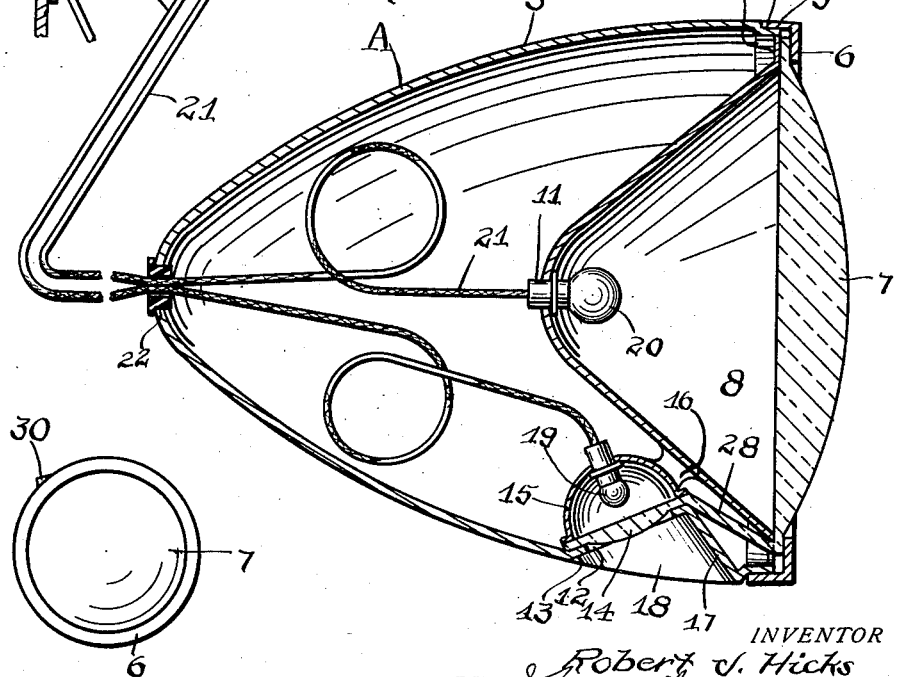
Fig. 2
Fig. 5
INVENTOR
Robert J. Hicks
BY
His ATTORNEY

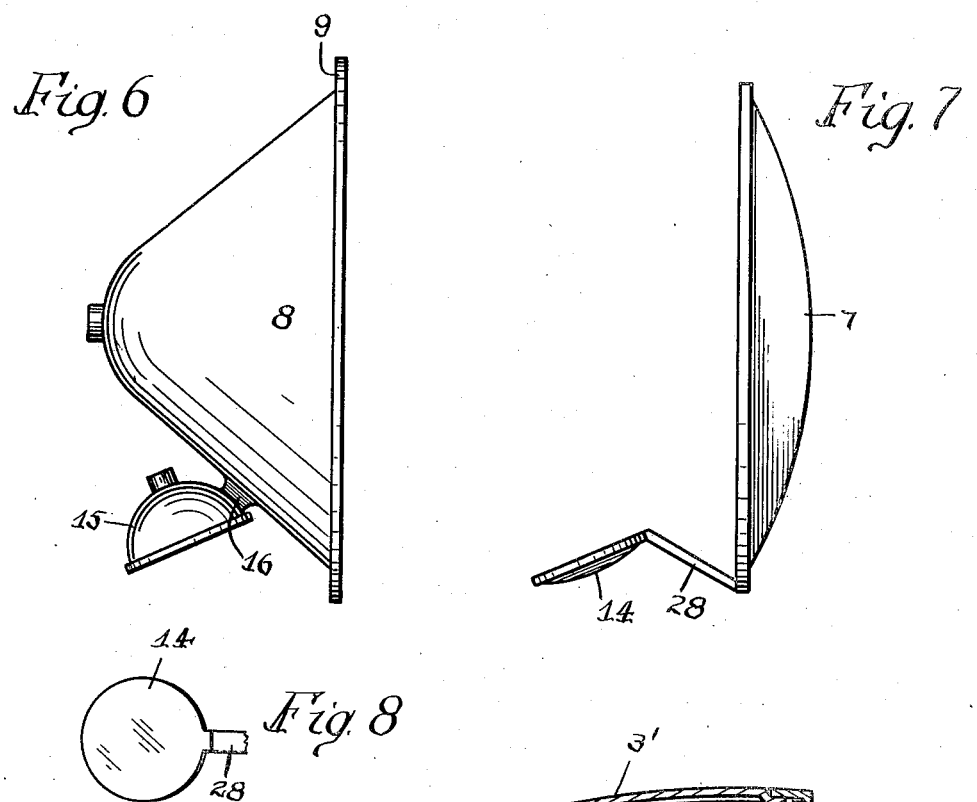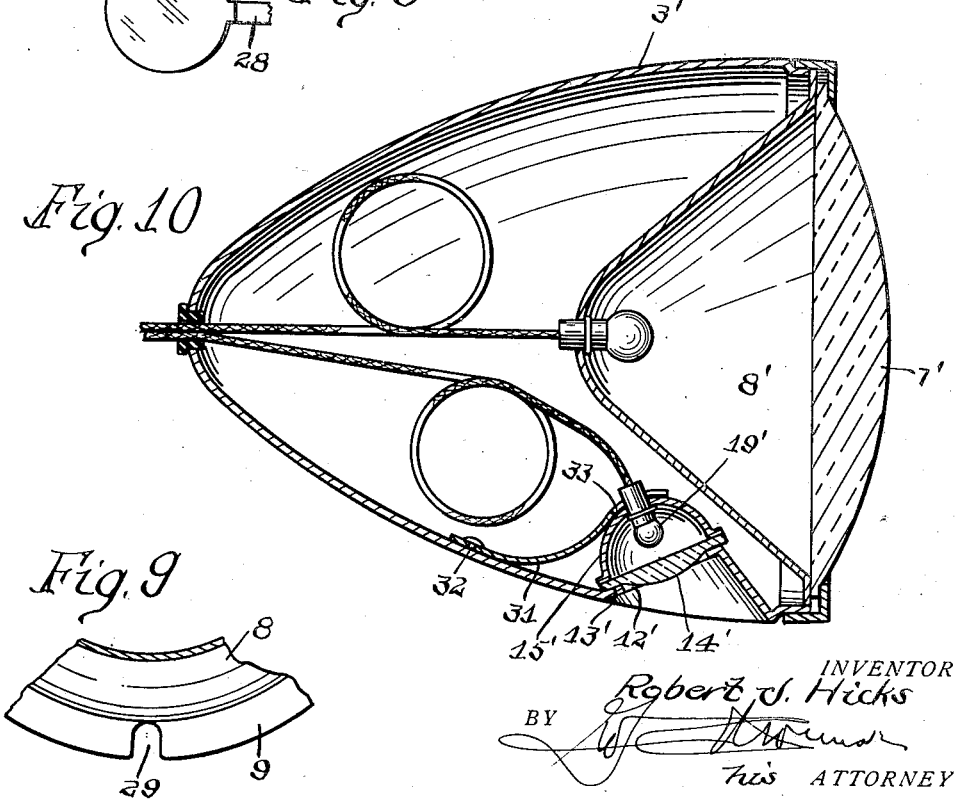

Patented Oct. 16, 1934

1,977,274

UNITED STATES PATENT OFFICE 1,977,274

HEADLIGHT FOR VEHICLES

Robert J. Hicks, Rochester, N. Y.

Application December 26, 1933, Serial No. 704,047

1 Claim. (Cl. 240—41.2)

This invention relates to headlights for vehicles.

Many automobile drivers have experienced more or less difficulty at night in the use of the usual headlights when making turns at road and street intersections, and difficulties have also been experienced at times, when passing other motorists or obstructions in the roadway when it has been practically impossible to intelligently determine or gage the space through which to pass without danger of side swiping and with a feeling of safety as regards remaining on the roadway without danger of running into ditches, banks, curves or other obstructions.

Therefore, one object of my invention is to provide a peculiarly formed headlight for motor or other vehicles, embodying among other essential characteristics, an outer shell containing the usual lens and reflecting means for straight ahead lighting purposes in the usual manner and a side light operable when needed for use independently of the main straight ahead lighting means and which is so mounted with relation to the main lighting means as not to obscure, diminish or in any way interfere with or affect the straight ahead illumination of the roadway and yet adapted to effectively and efficiently illuminate the immediate area or vicinity at the side of the vehicle to prevent side swiping or running off the road and particularly to enable the driver to negotiate turns at street or road crossings or intersections.

There are times when a driver is required to maneuver his car under cramped or limited conditions in the yard of his home or in a parking place in order that he might properly enter the garage or a parking space and it is therefore, another object of the invention to provide an auxiliary lighting means operable at will of the driver to enable him to make various turns and shifts to enter the garage or parking space without danger of striking other automobiles or obstructions, the auxiliary lighting means providing for the projection of light rays toward the front and also at the side of the automobile.

Another object of the invention is to provide a headlight for motor or other vehicles embodying a dual lighting means providing for straight ahead illumination and for side illumination, one operable independently of the other, and both readily controllable by the driver and which is in the nature of an unitary structure and constructed so that the reflecting means or interior of the shell may be readily accessible for cleaning or for repairs or other purposes.

A still further object of the invention is to provide a lighting means of the nature stated embodying an unitary device which may be readily installed for use and which is compact and rigid and capable of performing all of the functions required thereof quickly in an emergency and which by virtue of light rays thrown transversely across the road from the left of the vehicle not only aids observation in the interests of passing drivers but the invention facilitates the making of turns without danger of meeting with obstacles or projections on the turns.

With these and other objects in view, the invention consists in the construction and novel combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention.

In the drawings Fig. 1 is a fragmentary view of a street or road intersection illustrating in plan an automobile equipped with my improved lighting means.

Fig. 2 is a horizontal longitudinal sectional view through one of the headlights, illustrating one embodiment of the invention and showing it coupled up with the switch mechanism on a dashboard of an automobile or other vehicle.

Fig. 3 is a view on a smaller scale illustrating a side elevation of one of the headlights.

Fig. 4 is a similar view in top plan.

Fig. 5 is a front elevation on a reduced scale showing one of the improved headlights.

Fig. 6 is a top plan view illustrating the main and auxiliary headlight reflectors coupled together prior to placing the same in the usual outer shell of a headlight.

Fig. 7 is a top plan view of an unitary device in the nature of a double lens structure for the dual reflector structure illustrated in Fig. 6.

Fig. 8 is a detail fragmentary view illustrating the width of the connection 28 between the main and auxiliary lenses.

Fig. 9 is a fragmentary detail view of the front of the outer shell showing a notch or passage for the connecting part between the lenses of the unitary dual lens structure.

Fig. 10 is a horizontal longitudinal sectional view of a modified form of the invention.

Referring now more particularly to the accompanying drawings, and especially to Figs. 1 to 9, inclusive, the reference character 1 indicates an automobile or other vehicle provided with my new design of headlights, indicated, generally, by the reference character A.

The vehicle 1 is shown as located at a position with relation to a street or road intersection and the vehicle about to make a turn to the right to avoid the corner 2 and indicating by diverging lines *a* the light rays projecting from the side of the right hand headlight to facilitate the turn without danger of running into the curb or corner or other obstruction 2 at the intersection, the dotted lines *b* indicating the straight ahead light rays normally employed for lighting up the roadway in the usual manner ahead of the automobile or other vehicle.

My improved headlights are constructed alike and a description is therefore necessary for only one of them to give an understanding of the invention and each includes a housing or outer shell 3 of substantially conical shape but which it will be understood may be of any other common or suitable shape and which has at its outer end an annular peripheral shoulder 4 adapted to tightly receive the annular flange 5 of the lens securing ring 6 whereby to effectively secure the lens 7 detachably to the front of the outer shell or housing 3.

This particular means for securing the lens 7 in place is shown merely for purposes of illustration and it will be understood that any of the common means now employed for securing the main lens 7 in place may be employed for the purpose.

A main reflector 8 is located within the housing or outer shell 3 in any suitable manner and in the appropriate place as is common in headlights for motor vehicles. As shown, the main reflector 8 has a marginal flange 9 extending outwardly therefrom with its peripheral edge fitting snugly under the aforesaid annular flange 5 within the shell 3 at the outer end thereof. The peripheral edge of the lens 7 fits against the flange 9 and the front edge of the shell 3 and is clamped thereagainst by the securing ring 6. The apex of the preferably conical reflector 8 is provided with an opening 11 for a purpose presently explained.

The housing or shell 3 is provided in the outer side wall thereof between the axis and the top of the shell with an opening 12 which is formed by an inwardly directed portion 13 of the shell 3 forming a seat for an auxiliary lens 14 which is maintained over the opening 12 on the seat 13 by an auxiliary reflector 15 supported from the main reflector 8 by a connecting member 16 whereby the main reflector 8 and the auxiliary reflector 15 are rigidly coupled together, in one embodiment of the invention, as an unitary device.

By reason of the formation of the parts 13 and 17 there is provided an inset opening 12 for the seating of the auxiliary lens 14 and there is also provided a grooved wall 18 leading from the seat 13 outwardly through the side of the housing or shell 3 in a direction to throw light rays forwardly of the vehicle and to the side thereof to illuminate the vicinity or area in advance and particularly to the side of the vehicle at the front thereof, the auxiliary reflector 15 having a light bulb 19 detachably mounted therein in any suitable manner.

A light bulb 20 is removably mounted in the aforesaid opening 11 at the minor end of the main reflector 8 and it has the usual wired connection 21 leading from the bulb 20 through an opening 22 at the inner end of the shell 3 to a switch board 23 disposed on the dashboard 24 of the vehicle and whereby the main straight ahead lighting means of the automobile may be thrown into or out of operation through the instrumentality of any suitable connection of electric switch 25, it being understood that the switch 25 is coupled up with the ignition system in any well known manner or otherwise in an electric circuit for the establishment of lighting purposes.

The bulb 19 of the auxiliary lighting means is connected by suitable electric wiring 26 with the switch mechanism 23 and the bulb 19 cut into or out of the circuit by means of a suitable switch 27 of any suitable character and in any suitable manner.

It will be understood that the auxiliary lighting means is arranged with relation to the housing or outer shell 3 to provide for the projection of light rays over, downwardly and beyond the usual front fender of an automobile and by virtue of the grooved wall 18 the auxiliary rays are concentrated to some extent but sufficiently spread as to provide effective illumination for the purposes of the present invention.

In this particular embodiment of the invention the lenses 7 and 14 may be composed of a single piece of material and produced in any common and well known manner and rigidly connected together by a connecting portion 28, as shown particularly in Figs. 2 to 7, the connecting piece 28 being relatively narrow so that it may pass through the notch or passage 29 in the flange 9 of the main reflector 8. These lenses 7 and 14 are thus positioned at proper angles with relation to each other to properly and effectively take their seats, the main lens with relation to the main reflector and the smaller lens with relation to the auxiliary reflector and the seat between which and the auxiliary reflector the lens 14 is mounted. Moreover, the rigid connection 28 between the lenses 7 and 14 facilitates assembling the headlight parts.

If desired a small curved hood 30 may project from the outer shell 3 over the grooved passage 18, as shown in Figs. 3 and 5 but this hood 30 may be dispensed with if desired.

To remove the lenses together, the main lens ring 5—6 is removed from the housing or shell 3 in the usual manner and the main reflector is swung outwardly at a point opposite the small or auxiliary reflector until the latter clears its lens seat 13 on the shell when the lenses and the reflectors may be removed from the shell as a unit.

In another embodiment of the invention, and as shown particularly in Fig. 10, the main reflector 8' is unconnected with the auxiliary reflector 15' and the main lens 7' is unconnected with the auxiliary lens 14' and in this modification, the reflector 15' may be held in place by a spring 31 having its inner end secured by a rivet 32 or otherwise to the inner wall of the housing or shell 3' with its outer free end curved to the shape of the auxiliary reflector 15' and provided with a slot 33 to embrace the socket of the bulb 19' whereby to effectively hold the auxiliary reflector 15' against the lens 14' and effectively hold the lens 14' on its seat over the opening 12'.

In the modified form of the invention the lenses are not of an unitary type and the reflectors are not of an unitary type as in the other form first described and under certain conditions may be preferable to the preferred form of the invention first described herein.

In either form of the invention effective provision has been made for the issuance of light rays in different directions, one beam of rays being directed straight ahead in the usual manner and the other beam of light rays being directed forwardly and to one side of the headlight for the purposes hereinbefore stated and through the instrumentality of my invention a driver of a motor or other vehicle is enabled to remain at his seat and conveniently manipulate the auxiliary light when needed to prevent side swiping or to prevent running off the roadway or at the time it is desired to negotiate a turn at a street or road crossing or intersection or at any other place or time.

What is claimed is:—

A headlight for vehicles comprising a rearwardly tapered shell of conventional substantially conical form open at the front end and provided adjacent the front end at the outer side with a relatively small lateral opening, said shell being closed at the back, top, bottom and sides except for the small lateral opening, light reflecting means including a rearwardly tapered main front reflector of the size of the full front end of the shell and fitting the same, the taper of the main reflector providing an intervening space between the reflector and the shell at the lateral opening and an auxiliary side reflector located exteriorly of the main reflector in rear of the front edge thereof and wholly within the said intervening space at the lateral opening and arranged to direct rays of light downwardly, laterally and forwardly at an inclination to illuminate the area at the outer side of and in advance of the vehicle, said reflectors being rigidly connected together and forming an unitary structure to enable the light reflecting means to be inserted in and removed from the said outer shell as a unit, and main and auxiliary lenses fitting the reflectors and having an integral connecting portion and forming a single lens unit, said lenses being supported by the reflectors and adapted to be placed in and removed from the shell with the reflectors as a unit.

ROBERT J. HICKS.